Patented Apr. 3, 1923.

1,450,507

UNITED STATES PATENT OFFICE.

PHILIP ALEXANDER MACKAY, OF LONDON, ENGLAND.

METHOD OF RECOVERING VANADIUM FROM ITS ORES.

No Drawing. Application filed September 23, 1920. Serial No. 413,417.

*To all whom it may concern:*

Be it known that I, PHILIP ALEXANDER MACKAY, citizen of the United States, residing at London, England, have invented a Method of Recovering Vanadium from Its Ores, of which the following is a specification.

This invention relates to a method of recovering vanadium from its ores. Vanadium may be described as one of the acid forming elements in so far as its oxide is concerned, and when found in nature is usually found as the vanadate and this vanadate is usually the vanadate of lead, in which the lead is the base and the vanadium pentoxide $V_2O_5$ is the acid. It should be understood, however, that other ores of vanadium, for instance, combined with calcium, or the like, may be employed, and the object of the invention is to recover the vanadium in an inexpensive manner.

This invention consists in the treatment of the vanadium ore by oleum. By oleum is meant a solution of $SO_3$ in sulphuric acid; and in the case in which the ore is vanadate of lead it is known that the lead combines with the $SO_3$ to form the lead sulphate, and the vanadium pentoxide ($V_2O_5$) is set free. This vanadium pentoxide, however, is not always in the simple state, in which case some further steps are necessary.

In the first place, therefore, the invention embraces the decomposition of a vanadate by using oleum, and the precipitation of the lead sulphate so formed by diluting the solution with water. In the case in which the vanadium pentoxide is not in the simple state, and before treating the solution with water, I may treat the solution with a reducing agent, for example, $SO_2$ gas, or hydrochloric acid, in order to reduce the $V_2O_5$ to $V_2O_4$ which tetroxide then combines with sulphuric acid and forms $V_2O_2(SO_4)2$ to form vanadyl sulphate, which is soluble in water, and may be separated from the lead sulphate previously formed. This vanadyl sulphate may then be reconverted into $V_2O_5$ by oxidation, the solution being filtered after the removal of the vanadium from the lead sulphate before oxidation; the $V_2O_4$ is in solution in the dilute sulphuric acid solution, and may be recovered in the form of $V_2O_5$ as a precipitate after oxidation. The vanadyl sulphate solution may be precipitated as as such by neutralizing the solution. In place of the $SO_2$ gas as above mentioned as a reducing agent the reduction may be effected by adding a carbonaceous material to the acid solution, by which means $SO_2$ is evolved and reacts upon the vanadium pentoxide to reduce it to vanadium tetroxide, $V_2O_4$, which combines as before to form vanadyl sulphate soluble in water.

In the processes herein mentioned heat may be employed or not as found to be necessary, but the employment of oleum results in an exothermic reaction which does not require the application of external heat, and preferably oleum may be used in these processes in excess, so as to expedite the reaction, but in cases where thermal loss by radiation obtains, a small external heating agency may be applied to neutralize such loss. In practice I have found that fine grinding of the ore before treatment with the acid and continuous agitation during the reaction greatly expedites the whole operation.

Further, the known cast iron vessels used in oleum manufacture are well suited to carry out the process above described and to minimize losses by radiation any suitable outer covering may be applied.

When treating lead vanadates for the recovery of vanadium I find good results are obtained by first crushing the ore to about 200 mesh and then mixing the ore with oleum in the following proportion:

1.5 parts by weight of oleum to
1 part by weight of crushed ore.

In such proportion sufficient exothermic reaction is obtained to eliminate the necessity of applying external heat. During the reaction the solution should be continuously agitated.

In order to reduce the pentoxide to a tetroxide I then introduced $SO_2$ gas or hydrochloric acid until the required transformation is obtained as is well known in the art.

The vanadyl sulphate solution is then filtered from the lead sulphate and oxidation of the former obtained by the use of permanganate of potassium or sodium, or the pentoxide may be formed by using an electric current with a porous diaphragm, in which case the pentoxide is formed at the anode and a lower oxide precipitates on the cathode.

What I claim as new and useful, and of my own invention, and desire to secure by Letters Patent, is:—

1. A method of recovering vanadium pentoxide from the other oxides combined with it in vanadium ores, particularly lead oxide, by subjecting the ore to the action of oleum at a suitable temperature, reducing the vanadium pentoxide to vanadium tetroxide, in order to obtain vanadyl sulphate, and subsequently diluting the solution with water to precipitate the insoluble constituents of the ore and to leave the vanadium in solution.

2. A method of recovering vanadium pentoxide from the other oxides combined with it in vanadium ores, particularly lead oxide, by subjecting the ore to the action of oleum in excess, whereby the required temperature is wholly obtained by exothermic reaction, reducing the vanadium pentoxide to vanadium tetroxide in order to obtain vanadyl sulphate, and subsequently diluting the solution with water to precipitate the insoluble constituents of the ore and to leave the vanadium in solution.

3. A method of recovering vanadium pentoxide from vanadates of lead in which the ore is subjected to the action of oleum, thereby setting free the vanadium pentoxide, the solution is treated with sulphur dioxide gas and subsequently diluted with water to separate the obtained lead and vanadyl sulphates and finally reconverting the vanadyl sulphate to vanadium pentoxide.

4. A method of recovering vanadium pentoxide from vanadates of lead in which the ore is subjected to the action of oleum in excess whereby the required temperature is obtained by exothermic reaction, thereby setting free the vanadium pentoxide, the solution is treated with sulphur dioxide gas and subsequently diluted with water to separate the obtained lead and vanadyl sulphates and finally reconverting the vanadyl sulphate to vanadium pentoxide.

5. A method of recovering vanadium pentoxide from vanadates of lead in which the ore is subjected to the action of oleum thereby setting free the vanadium pentoxide, adding to the solution a carbonaceous material so that sulphur dioxide is evolved, subsequently diluting the solution with water to separate the obtained lead and vanadyl sulphates, filtering the solution and finally reconverting the vanadyl sulphate to vanadium pentoxide by oxidation.

6. A method of recovering vanadium pentoxide from vanadates of lead in which the ore is subjected to the action of oleum in excess whereby the required temperature is obtained by exothermic reaction, thereby setting free the vanadium pentoxide, adding to the solution a carbonaceous material so that sulphur dioxide is evolved, subsequently diluting the solution with water to separate the obtained lead and vanadyl sulphates, filtering the solution and finally reconverting the vanadyl sulphate to vanadium pentoxide by oxidation.

In testimony whereof I affix my signature.

PHILIP ALEXANDER MACKAY.

Witness:
LEWIS B. L. SPARKS.